United States Patent
Watanabe et al.

(10) Patent No.: US 9,649,980 B2
(45) Date of Patent: May 16, 2017

(54) VEHICULAR DISPLAY APPARATUS, VEHICULAR DISPLAY METHOD, AND VEHICULAR DISPLAY PROGRAM

(71) Applicant: NISSAN MOTOR CO., LTD., Yokohama-shi, Kanagawa (JP)

(72) Inventors: Seigo Watanabe, Yokohama (JP); Norimasa Kishi, Yokohama (JP); Takura Yanagi, Yokohama (JP); Yoshiro Takamatsu, Cupertino, CA (US)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 8 days.

(21) Appl. No.: 14/401,305

(22) PCT Filed: Apr. 5, 2013

(86) PCT No.: PCT/JP2013/002365
§ 371 (c)(1),
(2) Date: Nov. 14, 2014

(87) PCT Pub. No.: WO2013/171962
PCT Pub. Date: Nov. 21, 2013

(65) Prior Publication Data
US 2015/0145996 A1    May 28, 2015

(30) Foreign Application Priority Data
May 18, 2012    (JP) .................................. 2012-115048

(51) Int. Cl.
*B60R 1/00*    (2006.01)
*H04N 7/18*    (2006.01)
(Continued)

(52) U.S. Cl.
CPC .................. *B60R 1/00* (2013.01); *G06T 5/50* (2013.01); *G06T 11/00* (2013.01);
(Continued)

(58) Field of Classification Search
CPC ................ B60R 1/00; B60R 2300/308; B60R 2300/8053; B60R 2300/305
(Continued)

(56) References Cited

U.S. PATENT DOCUMENTS

2003/0025615 A1* 2/2003 Kato et al. ...................... 340/990
2006/0200277 A1* 9/2006 Yoshida et al. .................. 701/1
(Continued)

FOREIGN PATENT DOCUMENTS

JP    2005-332104 A    12/2005
JP    2006-287513 A    10/2006
(Continued)

OTHER PUBLICATIONS

Alexander Toet et al., Augmenting Full Colour-Fused Multi-Band Night Vision Imagery With Synthetic Imagery in Real-Time, International Journal of Image and Data Fusion, Jul. 18, 2011, vol. 2, No. 4, pp. 287-308.
(Continued)

*Primary Examiner* — Gims Philippe
*Assistant Examiner* — On S Mung
(74) *Attorney, Agent, or Firm* — Foley & Lardner LLP

(57) ABSTRACT

Captured images obtained beforehand by imaging ranges corresponding to peripheries of a vehicle, or processed images generated to correspond to the captured images are stored to be associated with stored road information of a preset area. A superimposed area having a clarity lower than a preset clarity threshold is set in a captured image of a periphery of the vehicle. A superimposition image is extracted among the stored images, the superimposition
(Continued)

image being an image of a range corresponding to the captured image. A superimposed image is generated by superimposing an image in an area in the extracted superimposition image corresponding to the superimposed area on the captured mage. A video generated from the superimposed image is displayed at a position visible from a driver.

14 Claims, 3 Drawing Sheets

(51) Int. Cl.
    *G08G 1/0962*     (2006.01)
    *G08G 1/16*     (2006.01)
    *G06T 5/50*     (2006.01)
    *G06T 11/00*     (2006.01)

(52) U.S. Cl.
    CPC ......... *G08G 1/09626* (2013.01); *G08G 1/166* (2013.01); *G08G 1/167* (2013.01); *H04N 7/18* (2013.01); *B60R 2300/305* (2013.01); *B60R 2300/308* (2013.01); *B60R 2300/8053* (2013.01); *G06T 2207/10024* (2013.01); *G06T 2207/10048* (2013.01); *G06T 2207/20221* (2013.01); *G06T 2207/30252* (2013.01)

(58) Field of Classification Search
    USPC .................................. 348/148, 149; 382/103
    See application file for complete search history.

(56) References Cited

U.S. PATENT DOCUMENTS

| | | | |
|---|---|---|---|
| 2007/0285217 | A1 | 12/2007 | Ishikawa et al. |
| 2009/0310866 | A1* | 12/2009 | Hamasaki ............... G06T 11/00 382/190 |
| 2010/0315214 | A1* | 12/2010 | Yano et al. .................... 340/435 |
| 2011/0293145 | A1* | 12/2011 | Nogami et al. ............... 382/103 |

FOREIGN PATENT DOCUMENTS

| | | |
|---|---|---|
| JP | 2007-300181 A | 11/2007 |
| JP | 2009-098718 A | 5/2009 |
| JP | 2010-012904 A | 1/2010 |
| JP | 2011-191264 A | 9/2011 |

OTHER PUBLICATIONS

Achala Chathuranga Aponso et al., Review on State of Art Image Enhancement and Restoration Methods for a Vision Based Driver Assistance System with De-Weathering, Soft Computing and Pattern Recognition (SOCPAR) IEEE International Conference, Oct. 14, 2011, pp. 135-140.

Jan Salmen et al., Google Street View Images Support the Development of Vision-Based Driver Assistance Systems, URL:http://www.neuroinformatik.ruhr-uni-bochum.de/data/documents/salmenetal_streetviewcrawler_iv2012.pdf, Jan. 15, 2012, 5 pages.

* cited by examiner

VEHICULAR DISPLAY APPARATUS, VEHICULAR DISPLAY METHOD, AND VEHICULAR DISPLAY PROGRAM

TECHNICAL FIELD

The present invention relates to a vehicular display apparatus, a vehicular display method, and a vehicular display program, which process a captured image of a periphery of a vehicle to provide an occupant of the vehicle with the image.

BACKGROUND ART

Patent Literature 1, for example, describes a technique of processing a captured image of a periphery of a vehicle captured with a camera mounted on the vehicle, to provide an occupant of the vehicle with the image.

In the technique described in Patent Literature 1, the first capture unit is arranged to capture a horizontally long image, and the second capture unit is arranged to capture a vertically long image. Then, a feature point existing on the road surface is extracted from the image captured with the second capture unit, and the tilt angle of the imaging axis relative to the travel direction of a vehicle is changed depending on the vehicle speed to make the tracking of the extracted feature point easy.

CITATION LIST

Patent Literature

PTL 1: JP 2007-300181 A

SUMMARY OF INVENTION

Technical Problem

However, the technique described in Patent Literature 1 does not have a configuration processing the image of the periphery of the vehicle depending on a condition where the captured image includes an unclear area, for example, a weather condition such as sunlight or the like, or a condition where the contrast of the camera is unsuitable. Therefore, there may occur a problem of difficulty to respond to the situation when there is the unclear area in the captured image of the periphery of the vehicle in a nighttime, a dense fog, or the like.

The present invention has been made in view of the above problem, and has an object to provide a vehicular display apparatus, a vehicular display method and a vehicular display program capable of responding to the situation when there is the unclear area in the captured image.

Solution to Problem

In order to solve the above-mentioned problem, according to an aspect of the invention, at least ones of captured images obtained by imaging ranges corresponding to peripheries of a vehicle beforehand, or processed images generated to correspond to the captured images are stored to be associated with stored road information of a preset area. In addition, a superimposed area having a clarity lower than a preset clarity threshold is set in a captured image of a periphery of the vehicle. And a superimposition image being an image of a range corresponding to the captured image is extracted among the stored images. Furthermore, a superimposed image is generated by superimposing an image in an area in the extracted superimposition image corresponding to the superimposed area on the captured mage. A video generated from the superimposed image is displayed at a position visible from a driver of the vehicle. It is noted that the superimposition image is extracted on the basis of a detected position and a travel direction of the vehicle and the stored road information.

DESCRIPTION OF EMBODIMENTS

Hereinafter, embodiments of the invention will now be described with reference to the drawings.

First Embodiment

Hereinafter, the first embodiment of the invention (hereinafter, referred to as the present embodiment) will now be described with reference to the drawings.

(Configuration)

Figure 1:
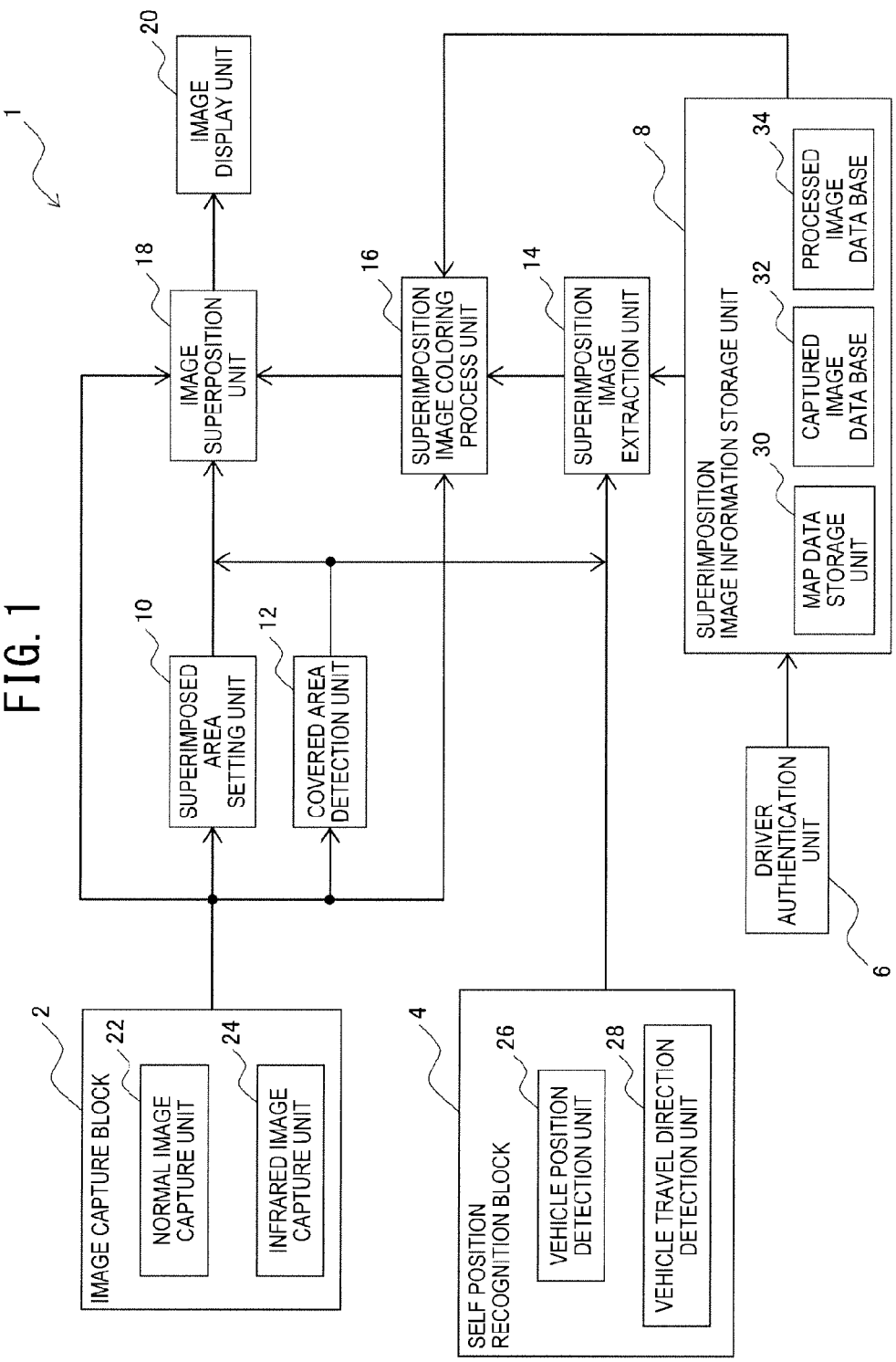
FIG. 1 is a block diagram illustrating a schematic configuration of a vehicular display apparatus according to the first embodiment of the present invention.

FIG. 1 is a block diagram illustrating a schematic configuration of a vehicular display apparatus 1 according to the present embodiment.

As illustrated in FIG. 1, the vehicular display apparatus 1 includes an image capture block 2, a self position recognition block 4, a driver authentication unit 6, a superimposition image information storage unit 8, a superimposed area setting unit 10, and a covered area detection unit 12. In addition, the vehicular display apparatus 1 includes a superimposition image extraction unit 14, a superimposition image coloring process unit 16, an image superimposition unit 18, and an image display unit 20.

The image capture block 2 includes a normal image capture unit 22, and an infrared image capture unit 24.

The normal image capture unit 22, for example, is capable of capturing color images, and is configured of a CCD (Charge-Coupled Device) camera attached in a vehicle interior of a vehicle (not illustrated) on which the vehicular display apparatus 1 is mounted. Additionally, the imaging direction of the normal image capture unit 22 is directed to the periphery of the vehicle, thus the normal image capture unit 22 captures an image of the periphery of the vehicle (an image of the outside of the vehicle with respect to the periphery centered at the vehicle).

In the present embodiment, the image captured by the normal image capture unit 22 is the color image of the periphery of the vehicle. That is, the normal image capture unit 22 captures the color image of the periphery of the vehicle.

Furthermore, the normal image capture unit 22 captures the image of the periphery of the vehicle to output an information signal including the captured image (hereinafter, may be referred to as "normal image signal") to the superimposed area setting unit 10, the covered area detection unit 12, and the image superposition unit 18.

The infrared image capture unit 24 is configured of, for example, an infrared (IR) camera, and is attached in the vehicle interior of the vehicle, similarly to the normal image capture unit 22. Additionally, the imaging direction of the infrared image capture unit 24 is directed to the periphery of the vehicle, similarly to the normal image capture unit 22, thus the infrared image capture unit 24 captures an infrared image of the periphery of the vehicle.

Furthermore, the infrared image capture unit 24 captures the infrared image of the periphery of the vehicle to output an information signal including the captured image (hereinafter, may be referred to as "infrared image signal") to the superimposed area setting unit 10, the covered area detection unit 12, and the image superposition unit 18.

The self position recognition block 4 includes a vehicle position detection unit 26, and a vehicle travel direction detection unit 28.

The vehicle position detection unit 26 is configured of, for example, a GPS (Global Positioning System) receiver. It is noted that the GPS receiver detects a coordinate indicating the position of the vehicle (current position), for example, on the basis of the radio waves transmitted by GPS satellites.

Additionally, the vehicle position detection unit 26 outputs an information signal including the detected position of the vehicle (hereinafter, may be referred to as "vehicle position signal") to the superimposition image extraction unit 14.

The vehicle travel direction detection unit 28 is configured of, for example, an electronic compass, and detects the travel direction of the vehicle (for example, a direction to which the front of the vehicle is directed with reference to the magnetic north). It is noted that a gyro sensor may be simultaneously used in the vehicle travel direction detection unit 28 to detect the inclination of the vehicle with respect to the horizontal plane. In this case, in addition to the travel direction of the vehicle, an elevation angle or a depression angle of the vehicle with respect to the horizontal plane is detected.

Additionally, the vehicle travel direction detection unit 28 outputs an information signal including the detected travel direction of the vehicle (hereinafter, may be referred to as "vehicle travel direction signal") to the superimposition image extraction unit 14.

The driver authentication unit 6 is configured of, for example, an IC (Integrated Circuit) reader capable of reading ID information of a driver stored in an IC chip embedded in a driver's license. In this case, the vehicle may have a configuration in which the IC reader links with the ignition switch of an engine, such that the engine can be started by reading the ID information of the driver with the IC reader.

Then, the driver authentication unit 6 outputs an information signal including the ID information of the driver read by the IC reader (hereinafter, may be referred to as "driver's ID signal") to the superimposition image information storage unit 8. That is, the driver authentication unit 6 authenticates the driver of the vehicle, and outputs information unique to the authenticated driver to the superimposition image information storage unit 8.

It is noted that, the configuration of the driver authentication unit 6 is not limited to a configuration including the IC reader. That is, when the vehicle has a configuration in which the seat position of the driver's seat can be changed to the position specific to each driver, for example, the seat position specific to the driver may be detected to identify the driver.

Additionally, when the vehicle has a configuration in which an input terminal for receiving a password links with the ignition switch, such that the engine can be started by inputting the password unique to the driver with the input terminal, for example, the driver may be identified by using the input password. In this case, instead of the input terminal of the password, a sensor capable of detecting the finger print of the driver may be used.

The superimposition image information storage unit 8 includes a map data storage unit 30, a captured image database 32, and a processed image database 34. Additionally, the superimposition image information storage unit 8 receives the input of the driver's ID signal output from the driver authentication unit 6.

In the map data storage unit 30, road information of a preset area is stored.

In the present embodiment, there is described as an example, a case where the road information is stored in the map data storage unit 30 to be individually associated with the driver authenticated by the driver authentication unit 6. Specifically, this road information is road information of the area where the driver authenticated by the driver authentication unit 6 usually drives the vehicle, in a case of Japan (JPN), for example, the road information of a selected prefecture (area).

Captured images are accumulated in the captured image database 32, the captured images being obtained beforehand by imaging a range corresponding to the periphery of the vehicle. It is noted that the captured images accumulated in the captured image database 32 are normal images (color images) similar to the image captured by the normal image capture unit 22. Additionally, the captured images accumulated in the captured image database 32 may be images captured by a camera mounted on the vehicle or images captured while walking.

Additionally, the captured images accumulated in the captured image database 32 may be updated by, for example, accessing any server or the like, in order to reflect temporal changes. Furthermore, when a configuration similar to the captured image database 32 is mounted on another vehicle, the captured images accumulated in the captured image database 32 may be updated by transmitting and receiving data while traveling via the inter-vehicle communication between the vehicle and the another vehicle.

Additionally, the captured image accumulated in the captured image database 32 is stored to be associated with the road information stored in the map data storage unit 30.

Processed images are accumulated in the processed image database 34, such that the processed images are generated so as to correspond to the captured images accumulated in the captured image database 32. In the present embodiment, there is described as an example, a case where the processed images accumulated in the processed image database 34 are three-dimensional (3D) images.

Additionally, the processed images accumulated in the processed image database 34 may be updated by, for example, accessing any server or the like, in order to reflect temporal changes. Furthermore, when a configuration similar to the processed image database 34 is mounted on the another vehicle, the processed images accumulated in the processed image database 34 may be updated by transmitting and receiving data while traveling via the inter-vehicle communication between the vehicle and the another vehicle.

Additionally, the processed image accumulated in the processed image database 34 is stored to be associated with the road information stored in the map data storage unit 30.

In such a configuration, the captured images and the processed images are stored in the superimposition image information storage unit 8 to be associated with the road information stored in the map data storage unit 30.

The superimposed area setting unit 10 receives the input of the normal image signal from the normal image capture unit 22 and the input of the infrared image signal from the infrared image capture unit 24.

Additionally, the superimposed area setting unit 10 refers to the normal image signal to set a superimposed area having a clarity lower than a preset clarity threshold in the image captured by the normal image capture unit 22.

Then, the superimposed area setting unit 10 outputs an information signal including the set superimposed area (hereinafter, may be referred to as "superimposed area signal") to the image superposition unit 18.

In the present embodiment, there is described as an example, a case where the superimposed area setting unit 10 detects a low gradation area where a gradation in the image captured by the normal image capture unit 22 is lower than a preset gradation threshold to set the detected low gradation area as the superimposed area.

In the present embodiment, the gradation threshold is set to a value with which the low gradation area is detected as an area where the gradation is lost to include blocked up shadows and an area where the gradation is lost to include blown out highlights, in the image captured by the normal image capture unit 22. Therefore, in the present embodiment, the clarity threshold is set such that areas in the image captured by the normal image capture unit 22 having a clarity lower than the clarity threshold include blocked up shadows and blown out highlights.

The covered area detection unit 12 receives the input of the normal image signal from the normal image capture unit 22, and receives the input of the infrared image signal from the infrared image capture unit 24.

Additionally, the covered area detection unit 12 refers to the normal image signal to detect a covered area in the image captured by the normal image capture unit 22, in the covered area, a road structure included in the road information stored in the map data storage unit 30 and a feature specific to a road included in the road information being covered with a cover.

Then, the covered area detection unit 12 outputs an information signal including the detected covered area (hereinafter, may be referred to as "covered area signal") to the superimposition image extraction unit 14.

Here, the road structure included in the road information is, for example, a curvature of the road (a curvature of a curved road), a boundary between a roadway and a sidewalk, an intersection, a road fork, a junction, a bank of a road surface, an irregularity of a road surface, or the like.

Additionally, the feature specific to the road included the road information is, for example, a traffic lane line, a traffic light, a road sign, a road surface marking, a lane marker (a road surface marker), or the like.

Additionally, the cover is, for example, another car traveling ahead of the vehicle (a preceding vehicle), a wall or a shrubbery formed near a road, a tree branch extending over the road from the side of the road, or the like. In addition, the cover may include, for example, an element relevant to a weather condition such as a fog (a dense fog), rain, snow, or the like.

The superimposition image extraction unit 14 receives the input of the vehicle position signal from the self position recognition block 4, and receives the input of the vehicle travel direction signal from the 12 self position recognition block 4. In addition, the superimposition image extraction unit 14 obtains the road information stored in the map data storage unit 30, depending on the processing to be performed.

Additionally, the superimposition image extraction unit 14 extracts a superimposition image on the basis of the position of the vehicle, the travel direction of the vehicle, the road information stored in the map data storage unit 30.

Here, the superimposition image is an image of a range corresponding to the image captured by the normal image capture unit 22 among the images stored in the superimposition image information storage unit 8.

Then, the superimposition image extraction unit 14 outputs an information signal including the extracted superimposition image (hereinafter, may be referred to as "superimposition image signal") to the superimposition image coloring process unit 16.

Furthermore, the superimposition image extraction unit 14 receives the input of the covered area information to extract a covered object image from the images stored in the superimposition image information storage unit 8.

Here, the covered object image is an image of the road structure and the feature specific to the road being covered with the cover in the covered area detected by the covered area detection unit 12.

Then, the superimposition image extraction unit 14 outputs an information signal including the extracted covered object image (hereinafter, may be referred to as "covered object image signal") to the superimposition image coloring process unit 16.

It is noted that the superimposition image extraction unit 14 may have a configuration, for example, which detects the position of the shift lever (selector) of the vehicle to switch the superimposition image to be extracted depending on the detected position. In this case, when the selected position is the forward movement ("D" range in a case of an AT (Automatic Transmission) vehicle), the captured image corresponding to a situation in which an area ahead of the vehicle is viewed from the vehicle interior is detected as the superimposition image. Additionally, when the selected position is the rearward movement ("R" range in a case of the AT vehicle), the captured image corresponding to a situation in which an area behind the vehicle is viewed from the vehicle interior.

The superimposition image coloring process unit 16 receives the inputs of the information signals output from the normal image capture unit 22, the infrared image capture unit 24, and the superimposition image extraction unit 14. In addition, the superimposition image coloring process unit 16 obtains the road information stored in the map data storage unit 30, depending on the processing to be performed.

Additionally, the superimposition image coloring process unit 16 refers to an outline in the infrared image captured by the infrared image capture unit 24 and a color displayed in the image captured by the normal image capture unit 22 to color the superimposition image extracted by the superimposition image extraction unit 14. Such a processing generates an image by coloring plural areas in a processed image with the colors displayed on the image captured by the normal image capture unit 22, the processed image being formed by using the outlines in the infrared image to have the plural areas surrounded by the outlines.

It is noted that the color referred to for coloring the image formed of the outlines in the infrared image may be obtain by referring to a color displayed in the image captured by the normal image capture unit 22 in real time. Additionally, the color referred to for coloring the image formed of the outlines in the infrared image may be obtained by referring to a color displayed in the captured images accumulated in the captured image database 32. Furthermore, the color displayed in the image captured in real time and the color displayed in the captured images may be simultaneously referred to.

Then, the superimposition image coloring process unit 16 outputs an information signal including the colored superimposition image (hereinafter, may be referred to as "colored superimposition image signal") to the image superposition unit 18.

The image superposition unit 18 receives the inputs of the information signals output from the normal image capture unit 22, the infrared image capture unit 24, the superimposed area setting unit 10, the covered area detection unit 12, and the superimposition image coloring process unit 16.

Additionally, the image superposition unit 18 generates a superimposed image. The image superposition unit 18 outputs an information signal including the superimposed image (hereinafter, may be referred to as "superimposed image signal") generated in such a way, to the image display unit 20.

Here, the superimposed image is an image obtained by superimposing an image in an area in the superimposition image extracted by the superimposition image extraction unit 14, the area corresponding to the superimposed area set by the superimposed area setting unit 10, on the image captured by the normal image capture unit 22.

Additionally, when there is the feature specific to the road (see above) in the superimposed area set by the superimposed area setting unit 10, the image superposition unit 18 performs the following processing.

In this case, the image superposition unit 18 performs a processing (hereinafter, may be referred to as "feature image exclusively display processing") for generating the superimposed image in which there is only an image indicating the feature included in the superimposition image extracted by the superimposition image extraction unit 14, in an area where the feature lies in the image captured by the normal image capture unit 22.

Additionally, when there is the road structure (see above) in the superimposed area set by the superimposed area setting unit 10, the image superposition unit 18 performs the following processing in the area where the road structure lies in the image captured by the normal image capture unit 22.

In this case, the image superposition unit 18 performs a processing (hereinafter, may be referred to as "contrast adjusting display processing") for adjusting a superimposition degree of the superimposition image extracted by the superimposition image extraction unit 14 on the image captured by the normal image capture unit 22. Specifically, the image superposition unit 18 performs a processing for generating the superimposed image by adjusting the superimposition degree of the superimposition image extracted by the superimposition image extraction unit 14 to a degree proportional to the contrast of the image captured by the normal image capture unit 22.

In the present embodiment, there is described as an example, a case where the contrast adjusting display processing is performed such that the superimposition degree on the image captured by the normal image capture unit 22 increases from the lower part to the upper part in the screen on which the image display unit 20 displays a video.

Figure 2:
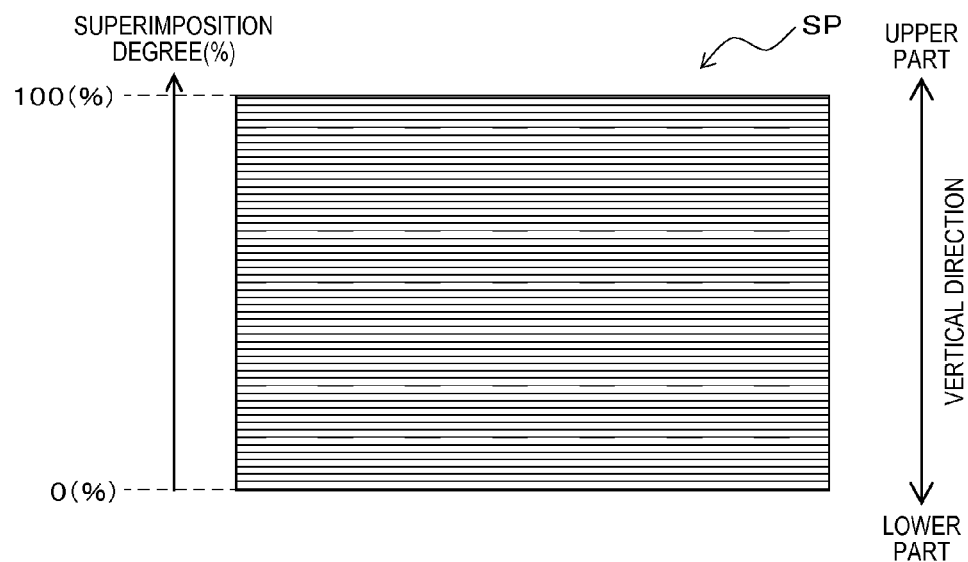
FIG. 2 is a view illustrating an example of a state where a superimposition degree is set on a screen on which an image display unit displays a video.

In such a processing, as illustrated in FIG. 2, for example, the superimposition degree at the lowermost end of the superimposed image SP is set 0(%), and the superimposition degree at the uppermost end of the superimposed image SP is set 100(%) in the screen on which the image display unit 20 displays the video. Additionally, the superimposition degree in the area between the lowermost end and the uppermost end of the superimposed image SP is set to increase in a step-by-step manner. It is noted that FIG. 2 is a view illustrating an example of a state where the superimposition degree is set on a screen on which the image display unit 20 displays a video.

It is noted that, in the contrast adjusting display processing, the superimposition degree of the superimposition image may be varied between a case when an irradiation angle of the headlight of the vehicle is normal (low beam) and a case when the illumination angle is higher (high beam).

Additionally, in the contrast adjusting display processing, the image superposition unit 18 generates the superimposed image in which the superimposition degree of the superimposition image increases from an area indicating a position closer to the normal image capture unit 22 to another area indicating another position farther from the normal image capture unit 22 in the superimposed image SP. Such a configuration varies the superimposition degree of the superimposition image in the superimposed image SP depending on a distance from the vehicle to generate the superimposed image SP in which the superimposition degree of the superimposition image is higher as farther from the vehicle.

Additionally, when there is another vehicle which is expected to move into the course of the vehicle in the image captured by the normal image capture unit 22, the image superposition unit 18 performs the following processing in the area where the another vehicle lies in the image captured by the normal image capture unit 22.

In this case, the image superposition unit 18 performs a processing (hereinafter, may be referred to as "anther vehicle area processing") for generating the superimposed image in which the superimposition degree on the image captured by the normal image capture unit 22 is less than the superimposition degree in an area other than the area the another vehicle lies.

Here, the another vehicle which is expected to move into the course of the vehicle in the image captured by the normal image capture unit 22 is, for example, the preceding vehicle traveling on the same travel lane as that of the vehicle, or an oncoming vehicle turning right. Furthermore, the another vehicle is, for example, a crossing vehicle traveling on a road crossing the travel lane of the vehicle, or a vehicle which travels on a road (side lane) merging into the travel lane of the vehicle (main lane) and intends to pull into traffic ahead of the vehicle (intends to cut in front of the vehicle).

Additionally, the image superposition unit 18 refers to the covered area signal received from the covered area detection unit 12. When the covered area is detected, the image superposition unit 18 performs the following processing.

In this case, the image superposition unit 18 performs a processing (hereinafter, may be referred to as "covered area processing") for generating the superimposed image by superimposing the covered object image extracted by the superimposition image extraction unit 14 and subjected to transparent processing, on the image captured by the normal image capture unit 22 in the above-mentioned covered area. In the covered area processing, for example, when the feature included in the covered area is a traffic light and the lighting state of the traffic light is available by means of a road-vehicle communication, the current lighting state (the state of the currently lighting color) may be reflected onto the image of the traffic light subjected to the transparent processing.

The image display unit 20 forms a video from the superimposed image generated by the image superposition unit 18, on the basis of the superimposed image signal received from the image superposition unit 18, and displays the video at a position visible from the driver of the vehicle.

In the present embodiment, the image display unit 20 has, for example, a configuration which displays the video generated from the superimposed image at a position visible from the driver in the vehicle interior of the vehicle. Accordingly, in the present invention, the image display unit 20 has a configuration capable of projecting the video generated from the superimposed image on the front window of the vehicle.

It is noted that the configuration of the image display unit 20 is not limited to the configuration capable of projecting the video generated from the superimposed image on the front window of the vehicle. That is, for example, a configuration displaying the video generated from the superimposed image on a Head-Up Display (HUD) or a display device of a navigation device may be employed.

Additionally, the configuration of the image display unit 20 is not limited to a configuration mounted on the vehicle. That is, for example, a configuration displaying the video generated from the superimposed image on a Head Mounted Display (HMD) worn by the driver of the vehicle.

Additionally, in displaying the video generated from the superimposed image generated by the image superposition unit 18, the image display unit 20 may perform, for example, a processing for correcting and reducing the degree of the distortion of the video generated from the superimposed image depending on the degree of the curve of the front window.

(Operation)

Next, an example of the operation performed by using the vehicular display apparatus 1 according to the present embodiment will be described with reference to FIG. 1 and FIG. 2, by using FIG. 3 and FIG. 4.

When the vehicle travels, first, the driver authentication unit 6 obtains the ID information of the driver driving the vehicle and outputs the driver's ID signal to the superimposition image information storage unit 8.

Then, while the vehicle travels, the normal image capture unit 22 captures the image of the periphery of the vehicle, and outputs the normal image signal to the superimposed area setting unit 10, the covered area detection unit 12, and the image superposition unit 18. Additionally, the infrared image capture unit 24 captures the infrared image of the periphery of the vehicle, and outputs the infrared image signal to the superimposed area setting unit 10, the covered area detection unit 12, and the image superposition unit 18.

In addition, while the vehicle travels, the vehicle position detection unit 26 detects the position of the vehicle, and outputs the vehicle position signal to the superimposition image extraction unit 14. Additionally, the vehicle travel direction detection unit 28 detects the travel direction of the vehicle, and outputs the vehicle travel direction signal to the superimposition image extraction unit 14.

Then, the superimposition image extraction unit 14 obtains the image data depending on the position and the travel direction of the vehicle from the superimposition image information storage unit 8, on the basis of the vehicle position signal and the vehicle travel direction signal.

Figure 3:
FIG. 3 is a view illustrating an example of an image of a periphery of a vehicle captured by the normal image capture unit.

Additionally, the superimposed area setting unit 10 sets the superimposed area SE in the image, for example, as illustrated in FIG. 3, which the normal image capture unit 22 captures by imaging the periphery of the vehicle (hereinafter, may be referred to as "real captured image RP"), on the basis of the normal image signal. It is noted that FIG. 3 is a view illustrating an example of an image of the periphery (forward area) of the vehicle captured by the normal image capture unit 22.

When the superimposed area setting unit 10 sets the superimposed area SE, the superimposition image extraction unit 14 extracts the superimposition image, and the image superposition unit 18 generates the superimposed image. Then, the image display unit 20 displays the video generated from the superimposed image generated by the image superposition unit 18 at the position visible from the driver, thus the video becomes visible from the driver.

In the present embodiment, when there is the feature specific to the road in the superimposed area set by the superimposed area setting unit 10, the image superposition unit 18 performs the above-mentioned feature image exclusively display processing.

That is, when there is a traffic lane line as a feature specific to the road in the superimposed area SE in a range surrounded by the circle C in FIG. 3, the image superposition unit 18 performs the feature image exclusively display processing such that there is only an image indicating the traffic lane line in the area where the traffic lane line lies in the image captured by the normal image capture unit 22.

Figure 4:
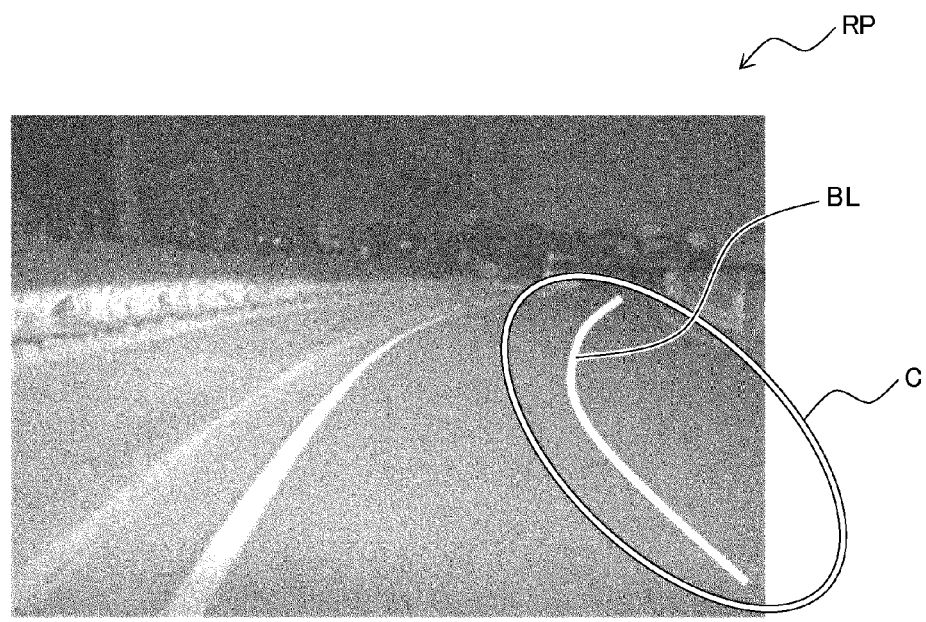
FIG. 4 is a view illustrating an example of an image subjected to a feature image exclusively display processing.

Accordingly, as illustrated in FIG. 4, the traffic lane line is displayed on the image subjected to the feature image exclusively display processing by the image indicative the traffic lane line, while the traffic lane line is not displayed before the feature image exclusively display processing. It is noted that FIG. 4 is a view illustrating an example of an image subjected to the feature image exclusively display processing. Additionally, in FIG. 4, the image indicative the traffic lane line is indicated with the reference symbol "BL".

Accordingly, in the present invention, the driver of the vehicle can visually recognize the traffic lane line, which is not displayed in the actually captured image. Thus, the driver can visually recognize the traffic lane line, even in a situation when there is an unclear area in the captured image.

Additionally, by displaying the video generated from the superimposed image generated by the image superposition unit 18 at the position visible from the driver of the vehicle, it is possible to reduce a moving amount of the directions of driver's eyes, and to make the superimposed image visible.

Additionally, in the conventional technique, for example, when the vehicle enters into a tunnel in the night traveling and the driver gazes at the bright inside of the tunnel which is in the travel course of the vehicle, it may be difficult for the driver to visually recognize an obstacle at the outside of the tunnel darker than the inside of the tunnel.

In contrast, in the present embodiment, at a state where the vehicle moved from the inside of the tunnel to the outside of the tunnel, the area including blocked up shadows or blown out highlights in the image captured by the normal image capture unit 22 can be complemented with the superimposition image to be visually recognized. Accordingly, it is possible to spuriously improve the dynamic range with which the normal image capture unit 22 captures images.

As described above, in a vehicular driving support method performed in the operation of the vehicular display apparatus 1 according to the present embodiment, the captured images and the processed images are stored to be associated with the road information, and the superimposition image which is the image of the range corresponding to the captured image of the periphery of the vehicle is extracted among these stored images. Then, the superimposed image is generated by superimposing the image in the extracted superimposition image, of the area corresponding to the superimposed area set in the captured image of the periphery of the vehicle as the area having a clarity lower than the preset clarity threshold, on the captured image of the periphery of the vehicle. Furthermore, the video generated from the superimposed image generated in this way is displayed at the position visible from the driver.

As described above, in the present embodiment, a vehicular display program causing a computer to execute each of the following steps is performed. Here, the steps executed by the computer includes: a map data storing step for storing the road information of the preset area; and a superimposition image information storing step for storing the captured images and the processed images to be associated with the road information stored in the map data storing step. Furthermore, the steps executed by the computer includes: a superimposed area setting step for setting the superimposed area in the image of the periphery of the vehicle captured by the normal image capture unit; and a superimposition image extracting step for extracting the superimposition image on the basis of the position and the travel direction of the vehicle and the road information stored in the map data storing step. In addition, the steps executed by the computer includes: an image superimposing step for generating the superimposed image with respect to the image captured by the normal image capture unit; and an image displaying step for displaying the video generated from the superimposed image generated in the image superimposing step at the position visible from the driver.

Advantageous Effects of the First Embodiment

The vehicular display apparatus 1 according to the present embodiment exhibits the following effects.

(1) The captured images and the processed images are stored in the superimposition image information storage unit 8 to be associated with the road information stored in the map data storage unit 30, and the superimposed area setting unit 10 sets the superimposed area in the captured image of the periphery of the vehicle. In addition, the superimposition image extraction unit 14 extracts the superimposition image. Furthermore, the image superposition unit 18 generates the superimposed image by superimposing the image in the superimposition image extracted by the superimposition image extraction unit 14, of the area corresponding to the superimposed area, on the image captured by the normal image capture unit 22, and then the video generated from the superimposed image is displayed at the position visible from the driver.

Therefore, even in a situation when there is an unclear area in the captured image of the periphery of the vehicle, in a nighttime, a dense fog, or the like, the video generated from the superimposed image is displayed at the position visible from the driver, the superimposed image indicating at least one of the captured image and the processed image of the range corresponding to the periphery of the vehicle.

Accordingly, it is possible to respond to the situation when there is an unclear area in the captured image, even in a situation such as a nighttime, a dense fog, or the like, the driver of the vehicle can easily understand the shape of the traveling road or the like of the vehicle.

Additionally, for example, even in a situation where the whole image captured by the normal image capture unit 22 is unclear, such as a case where the headlight of the vehicle fails in the night traveling, the driver of the vehicle can easily understand the shape of the traveling road or the like of the vehicle.

(2) The superimposed area setting unit 10 detects a low gradation area where a gradation is lower than a preset gradation threshold, in the image captured by the normal image capture unit 22, to set the detected low gradation area as the superimposed area.

Accordingly, it is possible to correct the deflection of the brightness of the illuminance, such as blocked up shadows, blown out highlights, or the like, which occurs in the night traveling due to the headlight of the vehicle, thus the driver of the vehicle can easily understand the shape of the traveling road or the like of the vehicle.

(3) When there is the feature specific to the road in the superimposed area, the image superposition unit 18 generates the superimposed image in which there is only an image indicating the feature included in the superimposition image extracted by the superimposition image extraction unit 14, in an area where the feature lies in the image captured by the normal image capture unit 22.

Accordingly, the driver of the vehicle can visually recognize the feature which is not displayed in the actually captured image, thus, the driver can visually recognize the feature, such as the traffic lane line or the like, even in a situation when there is an unclear area in the captured image.

(4) When there is the road structure in the superimposed area, the image superposition unit 18 set the superimposition degree of the superimposition image in the area in the image captured by the normal image capture unit 22 where the road structure lies to a degree proportional to the contrast of the image captured by the normal image capture unit 22.

Accordingly, it is possible to generate the superimposed image in which the state of the road structure lying in the superimposed area is approximated to the real state. Thus, it is possible to generate the superimposed image approximated to the real image.

(5) The image superposition unit 18 generates the superimposed image in which the superimposition degree of the superimposition image on the image captured by the normal image capture unit 22 increases from the lower part to the upper part in the screen on which the image display unit 20 displays a video.

Accordingly, it is possible to reflect an irradiation characteristic of the headlight on the superimposition degree of the superimposition image, the irradiation characteristic illuminating a lower area than the horizontal plane in the direction of forward movement of the vehicle. Thus, it is possible to generate the superimposed image approximated to the real image.

(6) The image superposition unit 18 generates the superimposed image in which the superimposition degree of the superimposition image on the image captured by the normal image capture unit 22 increases from the area indicating a position closer to the normal image capture unit 22 to the another area indicating another position farther from the normal image capture unit 22 in the superimposed image SP.

Accordingly, the superimposition degree of the superimposition image is increased with respect to the position far from the vehicle where the light irradiated from the headlights attenuates. Thus, the driver of the vehicle can easily understand the shape of the traveling road or the like of the vehicle.

(7) When there is another vehicle which is expected to move into the course of the vehicle in the image captured by the normal image capture unit 22, the image superposition unit 18 generates the superimposed image in which the superimposition degree of the superimposition image is less than the superimposition degree in the area other than the area the another vehicle lies. This process is performed in the area in the image captured by the normal image capture unit 22, where the another vehicle lies.

Accordingly, it is possible to generate the superimposed image indicating an actual state of the another vehicle which may come into contact with the vehicle in traveling.

(8) The covered area detection unit 12 detects a covered area in the image captured by the normal image capture unit 22, in the covered area, the road structure and the feature included the road information stored in the map data storage unit being covered with the cover. In addition, the superimposition image extraction unit 14 extracts a covered object image from the images stored in the superimposition image information storage unit 8. The image superposition unit 18 generates the superimposed image by superimposing the covered object image subjected to transparent processing on the image captured by the normal image capture unit 22 in the covered area.

Accordingly, it is possible to allow the driver of the vehicle to visually recognize the image in which the road structure or the feature invisible due to the cover being subjected to transparent processing and superimposed on the cover.

(9) The superimposition image coloring process unit 16 refers to an outline in the infrared image captured by the infrared image capture unit 24 and a color displayed in the image captured by the normal image capture unit 22 to color the superimposition image extracted by the superimposition image extraction unit 14.

Accordingly, it is possible to color the image having clear outlines based on the infrared image in which the outlines can be more clearly detected compared to the image captured by the normal image capture unit 22, with reference to the color displayed in the image captured by the normal image capture unit 22. Therefore, it is possible to generate the superimposed image well-reproduced.

(10) The road information of the preset area is stored in the map data storage unit 30 to be individually associated with the driver authenticated by the driver authentication unit 6, which authenticates the driver of the vehicle.

Accordingly, it is possible to store the road information in the map data storage unit 30 individually for each driver, thus, at least ones of the captured images and the processed images can be set individually depending on the driver.

(11) In the vehicular display method according the present embodiment, the superimposition image which is the image of the range corresponding to the captured image of the periphery of the vehicle is extracted among the stored images. Furthermore, the superimposed image is generated by superimposing the image in the extracted superimposition image, of the area corresponding to the superimposed area set in the captured image of the periphery of the vehicle as the area having a clarity lower than the preset clarity threshold, on the captured image of the periphery of the vehicle. In addition, the video generated from the superimposed image generated in this way is displayed at the position visible from the driver of the vehicle.

Therefore, even in a situation when there is an unclear area in the captured image of the periphery of the vehicle, such as a nighttime, a dense fog, or the like, the video generated from the superimposed image is displayed at the position visible from the driver, the superimposed image indicating at least one of the captured image and the processed image of the range corresponding to the periphery of the vehicle.

Accordingly, it is possible to respond to the situation when there is an unclear area in the captured image, even in a situation such as a nighttime, a dense fog, or the like, the driver of the vehicle can easily understand the shape of the traveling road or the like of the vehicle.

(12) In the vehicular display program according the present embodiment, in the superimposed area setting step, the superimposed area is set in the image captured by the normal image capture unit. Furthermore, in the superimposition image extracting step, the superimposition image which is the image of the range corresponding to the image captured by the normal image capture unit is extracted among the images stored in the superimposition image information storing step. In addition, in the image superimposing step, the superimposed image is generated by superimposing the image in the superimposition image extracted in the superimposition image extracting step, of the area corresponding to the superimposed area set in the superimposed area setting step, on the image captured by the normal image capture unit. In the image displaying step, the video generated from the superimposed image generated in the image superimposing step is displayed at the position visible from the driver.

Therefore, even in a situation when there is an unclear area in the captured image of the periphery of the vehicle, such as a nighttime, a dense fog, or the like, the video generated from the superimposed image is displayed at the position visible from the driver, the superimposed image indicating at least one of the captured image and the processed image of the range corresponding to the periphery of the vehicle.

Accordingly, it is possible to respond to the situation when there is an unclear area in the captured image, even in a situation such as a nighttime, a dense fog, or the like, the driver of the vehicle can easily understand the shape of the traveling road or the like of the vehicle.

(Modifications)

(1) In the present embodiment, the superimposition image coloring process unit 16 has the configuration which refers to an outline in the infrared image and a color displayed in the image captured by the normal image capture unit 22 to color the superimposition image extracted by the superimposition image extraction unit 14, however, the superimposition image coloring process unit 16 is not limited thereto.

That is, the superimposition image coloring process unit 16 may have a configuration which refers to a color displayed in the image captured by the normal image capture unit 22 to color the superimposition image extracted by the superimposition image extraction unit 14.

In this case, the superimposition image coloring process unit 16 may have a configuration without the infrared image capture unit 24 to reduce cost. Additionally, it is possible to reduce the processing step performed by the superimposition image coloring process unit 16.

(2) In the present embodiment, the vehicular display apparatus 1 has a configuration including the driver authentication unit 6, however, the vehicular display apparatus 1 is not limited thereto. The vehicular display apparatus 1 may have a configuration without the driver authentication unit 6.

(3) In the present embodiment, the superimposed image is generated by superimposing the image of the area corresponding to the superimposed area on the image captured by the normal image capture unit 22, that is, the color captured image of the periphery of the vehicle. However, the superimposed image is not limited thereto. That is, for example, the superimposed image may be generated by superimposing the image of the area corresponding to the superimposed area on the infrared image of the periphery of the vehicle captured by the infrared image capture unit 24.

(4) In the present embodiment, the image superposition unit 18 has a configuration which generates the superimposed image by superimposing the image in the superimposition image extracted by the superimposition image extraction unit 14, of the area corresponding to the superimposed area, on the image captured by the normal image capture unit 22. However, the configuration of the image superposition unit 18 is not limited thereto.

That is, the image superposition unit 18 may have a configuration which extracts a superimposition area section from the superimposition image being the image of a range corresponding to the normal image captured by the normal image capture unit 22 among the images stored in the superimposition image information storage unit 8. In addition, the image superposition unit 18 may have a configuration which generates the superimposed image by superimposing the superimposition area section extracted from the superimposition image on an unclear area in the normal image.

Here, the superimposition area section is an area corresponding to the unclear area in the normal image captured by the normal image capture unit 22 where the clarity is lower than the preset clarity threshold.

Additionally, when the image superposition unit 18 has the above-mentioned configuration, the superimposition image information storage unit 8 may have a configuration in which road positions preset on the road and the images captured at the road positions are respectively stored beforehand in the superimposition image information storage unit 8 to be associated with each other. In addition, the normal image capture unit 22 may have a configuration which captures a normal image in the travel direction of the vehicle detected by the vehicle travel direction detection unit 28. Furthermore, the image display unit 20 may have a configuration that displays the superimposed image generated by the image superposition unit 18 at the position visible from the driver of the vehicle.

According to the vehicular display apparatus 1 including the respective above-mentioned configurations, even in a situation where there is an unclear area in the captured image of the periphery of the vehicle, such as a nighttime, a dense fog, or the like, it is possible to display the superimposed image in which the superimposition area section is superimposed on the unclear area in the normal image at the position visible from the driver.

Accordingly, it is possible to respond to the situation where there is an unclear area in the captured image, even in a situation such as a nighttime, a dense fog, or the like, the driver of the vehicle can easily understand the shape of the traveling road or the like of the vehicle.

Additionally, for example, even in a situation where the whole image captured by the normal image capture unit 22 is unclear, such as a case where the headlight of the vehicle fails in the night traveling, the driver of the vehicle can easily understand the shape of the traveling road or the like of the vehicle.

Priority is claimed on Japanese Patent Application No. 2012-115048 (filed on May 18, 2012), the entire content of which is incorporated by reference as a part of this application.

While the present invention has been described with reference to the definite number of embodiments, the scope of the present invention is not limited thereto and improvements and modifications of the embodiments based on the above disclosure are obvious to those skilled in the art.

REFERENCE SIGNS LIST

1 vehicular display apparatus
2 image capture block
4 self position recognition block
6 driver authentication unit
8 superimposition image information storage unit
10 superimposed area setting unit
12 covered area detection unit
14 superimposition image extraction unit
16 superimposition image coloring process unit
18 image superposition unit
20 image display unit
22 normal image capture unit
24 infrared image capture unit
26 vehicle position detection unit
28 vehicle travel direction detection unit
30 map data storage unit
32 captured image database
34 processed image database
SP superimposed image
RP real captured image
SE superimposed area
BL image indicative traffic lane line

The invention claimed is:

1. A vehicular display apparatus comprising:
a map data storage in which road information of a preset area is stored;
a superimposition image information storage in which first images which are at least one of captured images obtained beforehand by imaging ranges corresponding to a periphery of a vehicle or processed images generated to correspond to the captured images are stored to be associated with the road information stored in the map data storage;
a Global Positioning System (GPS) receiver configured to detect a position of the vehicle;
a compass configured to detect a travel direction of the vehicle;
a camera configured to capture a second image of the periphery of the vehicle; and
a computer system programmed to:
set a superimposed area having a clarity lower than a preset clarity threshold in the second image captured by the camera, wherein the superimposed area having the clarity lower than the preset clarity threshold includes blocked up shadows and blown out highlights;
extract a superimposition image on a basis of the position of the vehicle detected by the GPS, the travel direction of the vehicle detected by the compass, and the road information stored in the map data storage, from among the first images captured before the camera captures the second image and stored in the superimposition image information storage, the superimposition image being an image of a range corresponding to the second image captured by the camera; and
generate a superimposed image, by superimposing a portion of the extracted superimposition image corresponding to the set superimposed area on the second image captured by the camera; and
an image display unit configured to display a video generated from the generated superimposed image at a position visible to a driver of the vehicle.

2. The vehicular display apparatus according to claim 1, wherein the computer system is programmed to detect a low gradation area where a gradation is lower than a preset gradation threshold, in the second image captured by the camera, and to set the detected low gradation area as the superimposed area.

3. The vehicular display apparatus according to claim 2, wherein the computer system is programmed to, when there is a feature specific to a road in the set superimposed area, generate the superimposed image in which there is only an image indicating the feature included in the extracted superimposition image, in an area where the feature lies in the second image captured by the camera.

4. The vehicular display apparatus according to claim 2, wherein the computer system is programmed to, when there is a road structure in the set superimposed area, generate the superimposed image in which, in the area where the road structure lies in the second image captured by the camera, a superimposition degree of the extracted superimposition image on the second image captured by the camera is set to a degree proportional to a contrast of the second image captured by the camera.

5. The vehicular display apparatus according to claim 4, wherein the computer system is programmed to generate the superimposed image in which the superimposition degree of the extracted superimposition image on the second image captured by the camera increases from a lower part to an upper part in a screen on which the image display unit displays the video.

6. The vehicular display apparatus according to claim 4, wherein the computer system is programmed to generate the superimposed image in which the superimposition degree of the extracted superimposition image on the second image captured by the camera increases from an area indicating a position closer to the camera to another area indicating another position farther from the camera in the superimposed image.

7. The vehicular display apparatus according to claim 2, wherein the computer system is programmed to, when there is another vehicle which is expected to move into a course of the vehicle in the second image captured by the camera, generate the superimposed image in which a superimposition degree of the extracted superimposition image on the second image captured by the camera in an area where the another vehicle lies in the second image captured by the camera is less than another superimposition degree in another area other than the area where the another vehicle lies.

8. The vehicular display apparatus according to claim 1, further comprising a covered area detection unit configured to detect a covered area in the second image captured by the camera, in the covered area, a road structure and a feature specific to a road included in the road information stored in the map data being covered with a cover,
wherein, the computer system is programmed to extract a covered object image from the first images stored in the superimposition image information storage, the covered object image being an image of the road structure and the feature specific to the road being covered with the cover in the covered area detected by the covered area detection unit, and
the computer system is programmed to generate the superimposed image by superimposing a covered object image and subjected to transparent processing, on the second image captured by the camera in the covered area detected by the covered area detection unit.

9. The vehicular display apparatus according to claim 1, further comprising:
an infrared image capture unit configured to capture an infrared image of the periphery of the vehicle; and
a superimposition image coloring process unit configured to refer to an outline in the infrared image captured by the infrared image capture unit and a color displayed in the second image captured by the camera to color the extracted superimposition image.

10. The vehicular display apparatus according to claim 1, further comprising a superimposition image coloring process unit configured to refer to a color displayed in the second image captured by the camera to color the extracted superimposition image.

11. The vehicular display apparatus according to claim 1, further comprising a driver authentication unit configured to authenticate the driver of the vehicle,
wherein the road information is stored in the map data storage to be individually associated with the driver authenticated by the driver authentication unit.

12. A vehicular display apparatus comprising:
a superimposition image information storage in which road positions preset on a road and first images captured at the road positions, respectively, are stored beforehand to be associated with each other;
a Global Positioning System (GPS) receiver configured to detect a position of a vehicle;
a compass configured to detect a travel direction of the vehicle;
a camera configured to capture a normal image, which is an image in the travel direction of the vehicle detected by the compass; and
a computer system programmed to extract a superimposition area section from a superimposition image, the superimposition image being an image of a range corresponding to the normal image captured by the camera among the images captured before the camera captures the normal image and stored in the superimposition image information storage, the superimposition area section corresponding to an unclear area in the normal image captured by the camera where a clarity is lower than a preset clarity threshold, to generate a superimposed image by superimposing the extracted superimposition area section on the unclear area in the normal image, wherein the superimposition area section having the clarity lower than the preset clarity threshold includes blocked up shadows and blown out highlights; and
an image display unit configured to display the generated superimposed image at a position visible to a driver of the vehicle.

13. A vehicular display method comprising:
storing first images which are at least one of captured images obtained beforehand by imaging ranges corresponding to a periphery of a vehicle or processed images generated to correspond to the captured images, to be associated with road information;
capturing a second image of a periphery of the vehicle with a camera;
extracting a superimposition image, the superimposition image being an image of a range corresponding to a captured image of the periphery of the vehicle among the first images stored and captured before the camera captures the second image;
setting a superimposed area having a clarity lower than a preset clarity threshold in the second image captured by the camera, wherein the superimposed area having the clarity lower than the preset clarity threshold includes blocked up shadows and blown out highlights;
generating a superimposed image by superimposing a portion of the extracted superimposition image corresponding to the superimposed area on the second image captured by the camera; and displaying a video generated from the superimposed image at a position visible to a driver of the vehicle.

14. A non-transitory computer readable medium storing a vehicular display program for causing a computer to execute a process, the process comprising:
- a map data storing step for storing road information of a preset area;
- a superimposition image information storing step for storing first images which are at least one of captured images obtained beforehand by imaging ranges corresponding to a periphery of a vehicle or processed images generated to correspond to the captured images, to be associated with the road information stored in the map data storing step;
- a superimposed area setting step for setting a superimposed area having a clarity lower than a preset clarity threshold in a second image captured by a camera capturing an image of the periphery of the vehicle, wherein the superimposed area having the clarity lower than the preset clarity threshold includes blocked up shadows and blown out highlights;
- a superimposition image extracting step for extracting a superimposition image on a basis of a position of the vehicle detected by a Global Positioning System (GPS) receiver detecting the position of the vehicle, a travel direction of the vehicle detected by a compass detecting the travel direction of the vehicle, and the road information stored in the map data storing step, from among the first images captured before the camera captures the second image and stored in the superimposition image information storing step, the superimposition image being an image of a range corresponding to the second image captured by the camera;
- an image superimposing step for generating a superimposed image, by superimposing a portion of the superimposition image extracted in the superimposition image extracting step corresponding to the superimposed area set in the superimposed area setting step on the second image captured by the camera; and
- an image displaying step for displaying a video generated from the superimposed image generated in the image superimposing step at a position visible to a driver of the vehicle.

* * * * *